United States Patent [19]

DeLong et al.

[11] Patent Number: 4,751,034
[45] Date of Patent: Jun. 14, 1988

[54] METHOD OF MOLDING USING DISSOCIATED LIGNOCELLULOSIC MATERIAL AND THE PRODUCT SO PRODUCED

[76] Inventors: Edward A. DeLong; Edward P. DeLong, both of 439-22560 Wye Road, Sherwood Park, Alberta, Canada, T8A 4T6; George S. Ritchie, 2428 West View Village, Winterburn, Alberta, Canada, T0E 2N0

[21] Appl. No.: 25,699

[22] Filed: Mar. 13, 1987

[30] Foreign Application Priority Data

Mar. 14, 1986 [CA] Canada ................................. 504132

[51] Int. Cl.$^4$ .......................... B29C 43/04; C07G 1/00
[52] U.S. Cl. ........................................ 264/115; 162/21;
264/77; 264/109; 264/500; 264/DIG. 80
[58] Field of Search .................... 162/21; 264/77, 109, 264/115, 122, 500

[56] References Cited

U.S. PATENT DOCUMENTS

| 1,812,969 | 7/1931 | Mason | 162/21 X |
|---|---|---|---|
| 2,037,522 | 4/1936 | Lundbäck | 264/109 X |
| 2,080,078 | 5/1937 | Mason et al. | 162/21 X |
| 2,224,135 | 12/1940 | Boehm | 162/21 X |
| 2,317,394 | 4/1943 | Mason et al. | 162/21 X |
| 2,889,242 | 6/1959 | Teichmann | 162/21 X |
| 3,021,244 | 2/1962 | Meiler | 264/109 X |
| 3,287,479 | 11/1966 | Naudain | 264/109 X |
| 3,305,499 | 2/1967 | Bevans | 264/109 X |
| 3,699,202 | 10/1972 | Verbestel | 264/109 |
| 4,107,379 | 8/1978 | Stofko | 264/109 X |
| 4,183,997 | 1/1980 | Stofko | 264/109 X |
| 4,379,808 | 4/1983 | Cole et al. | 264/109 X |
| 4,479,912 | 10/1984 | Bullock | 264/109 X |
| 4,497,662 | 2/1985 | Chisholm et al. | 264/109 X |
| 4,510,278 | 4/1985 | Hoetjer | 264/109 X |
| 4,528,309 | 7/1985 | Göte et al. | 264/109 X |
| 4,559,097 | 12/1985 | Janiga | 264/109 X |
| 4,597,930 | 7/1986 | Szal | 264/119 X |
| 4,627,951 | 12/1986 | Shen | 264/109 |
| 4,629,594 | 12/1986 | Munk | 264/109 X |

FOREIGN PATENT DOCUMENTS

| 147929 | 7/1949 | Australia | 162/21 |
|---|---|---|---|
| 1096374 | 2/1981 | Canada . | |
| 1141376 | 2/1983 | Canada . | |
| 1217765 | 2/1987 | Canada . | |

Primary Examiner—Robert Spitzer
Attorney, Agent, or Firm—Murray and Whisenhunt

[57] ABSTRACT

Dissociated lignocellulosic material produced by a process of explosive depressurization is molded into products of widely varying densities. Various fibrous and woody materials can be incorporated into the molded product to give a wide range of nailing and strength characteristics. Color, water repellent, preservative and fire retardant materials can be mixed with the material before molding. Other aggregates can be bound into the molded product which can contain fire enhancement materials for fuel.

25 Claims, No Drawings

METHOD OF MOLDING USING DISSOCIATED LIGNOCELLULOSIC MATERIAL AND THE PRODUCT SO PRODUCED

FIELD OF THE INVENTION

This invention relates to a method for producing a molded product from dissociated lignocellulosic material and to the product of this process. It also relates to the use of dissociated lignocellulosic material as a binder to replace in whole or in part the phenolic resins which are normally used in the production of plywood, waferboard, oriented strand board, particleboard and other molded products.

Dissociated lignocellulosic material, the starting material for the molding process described herein, is produced by a process of explosive depressurization. The explosion process utilizes lignocellulosic material, which includes such plant growth materials as oat hulls, corn stalks, bagasse, wheat straw, oat straw, barley straw, rice straw and woods of various specise. The explosion process comprises the following steps: (1) packing the lignocellulosic materials in a divided, exposed, moist form in a pressure vessel having a valved outlet; (2) with the valve closed, rapidly filling the pressure vessel with steam at a pressure of at least 400 psi to bring substantially all of the lignocellulosic material to a temperature in the range 185° C. to 240° C. in less than 60 seconds to thermally soften the lignocellulosic material into a plastic condition; and (3) as soon as the plastic condition has been attained, opening the valved outlet and instantly and explosively expelling the lignocellulosic material from the pressure vessel to atmosphere. This explosion process breaks the chemical crosslinks between the lignin and hemicellulose and produces a mixture of chemical substances. This mixture, referred to in this specification as "dissociated lignocellulosic material", is a particulate substance having the appearance of potting soil. It consists primarily of cellulose, lignin, acetic acid, gluouronic acid, furfural, xylose sugars and xylan, which substances are substantially chemically dissociated from each other. The steam explosion process is further described in Canadian Pat. Nos. 1,096,374, 1,141,376 and 1,217,765 to DeLong, which correspond to copending U.S. applications Ser. Nos. 574,451; 574,452; and 681,070, the disclosures of which are incorporated herein by reference, and the apparatus used in the process is illustrated and described therein.

SUMMARY OF THE INVENTION

It has previously been conceived that dissociated lignocellulosic material would be used as an animal feedstuff, or as a starting material from which the various chemical components of the mixture could be obtained. However, it has now been found that it is possible to recombine the dissociated components of the mixture produced by the process of explosive depressurization of lignocellulosic materials into a heavily crosslinked matrix by subjecting the mixture to heat and pressure in a mold. Various combinations of molding pressure and temperature and mold dwell time may be used to vary the degree of crosslinking of the material and thereby control the strength and density of the end product.

In some embodiments, the water-soluble components of the dissociated mixture are removed and then replaced by an alternative crosslinking composition.

In addition, it has been found that it is possible to make a molded product from a mixture of dissociated lignocellulosic material and various fibrous or woody materials. In this case, the dissociated lignocellulosic material acts as both a filler and a binder. Further, the dissociated lignocellulosic material in acting as a binder can encapsulate a variety of other aggregates such as coal, asphalt, fiber glass, and other non-woody materials.

The invention is therefore directed to a method of molding dissociated lignocellulosic material, with or without the addition of aggregate materials, to form a rigid product. The moisture level of the starting material may be reduced, if necessary, to a level suitable for molding. The material is then packed into a mold which has been preheated to a suitable temperature. Sufficient pressure is then applied for a sufficient time to form a rigid product. The molded product may be cured to relieve internal stresses by placing it under pressure in an unheated mold.

The economics of producing molded board and other products can be improved significantly by the removal of the water coluble fraction of the dissociated lignocellulosic material, and separating the isolated chemicals. This is especially true because the cost of replacement crosslinking chemicals is markedly less than the value of the water-solubles. A preferred method of extracting the water-soluble chemical compounds from dissociated lignocellulosic material comprises placing the material in a column having an upper and a lower opening, adding the water through the top opening, and, without agitating the contents of the column, allowing the solvent to percolate down through the dissociated lignocellulosic material, under the force of gravity, and then removing the solvent and dissociated substances through the lower opening of the column. Aqueous solutions of lignin crosslinking compositions can then be added to the column for wet mixing, by percolation as for water washing. The column contents are then removed, dewatered, then further dried as necessary to lower moisture levels. The resulting product can be molded in the same manner as that described herein for dissociated lignocellulosic material that has not been treated in this manner.

DETAILED DESCRIPTION OF THE PREFERRED EMBODIMENT

Dissociated lignocellulosic material freshly produced by the processes described above and in Canadian Pat. Nos. 1,096,374, 1,141,376 and 1,217,765 will normally contain excessive moisture, that is, a level of moisture that will hamper the molding process. It has been found that drying the material prior to molding it until the water content is about 5% produces good results. This drying may be carried out by simply exposing the material to air at ambient temperature for a sufficient length of time. The precise water content is not critical to the molding process as it still work, though less well, if somewhat more or less moisture is present.

Once the water content has been thus reduced, the material may be packed or injected into a mold of the desired size and shape. The molded product has been found to be a suitable substitute for particleboard, waferboard, fiberboard, hardboard, plywood and the like, so the mold may be shaped accordingly.

The molding pressure, temperature and dwell time selected will depend on the type of product desired.

The molding may take place over a wide range of temperatures. The crosslinking reactions that occur during molding take place more quickly at higher temperatures. It has been found that as the molding temperature is increased, the density of the product increases at constant pressure. Temperatures in the range of about 70° C. to 260° C. have been found useful in producing a general-purpose product. The desired molding temperature may be achieved by preheating the mold, and in this specification "molding temperature" means the temperature of the mold. Whether all of the material in the mold is heated to this temperature depends on the thickness of the mold and the dwell time. Alternatively, it is possible, when molding large volume products, for instance, railroad ties or structural components, to preheat the starting materials rather than, or in addition to, heating them in the mold. Preheating the material should be carried out in a closed vessel to prevent the escape of furfural and the like.

The molding pressure may also be selected from a wide range of pressures, depending on the desired density of the molded product. It has been found that molding pressures from about 20–1500 psi may be used. Pressures in the range of 600–700 psi can be used to produce a good general-purpose product.

To make a molded product similar to cork, a molding temperature of about 70°–110° C. and a molding pressure of about 20–90 psi may be used. Such a product might be used to encapsulate slow release nutrients in a biodegradeable planting pot.

It is possible to produce a low density molded product having increased toughness and water resistance by molding at relatively low temperature (e.g. 70°–120° C.) and then applying a mold platen heated to about 300° C. for a short time. This plasticizes the cellulose at the surface of the molded product.

To make a molded product having a density similar to that of furniture board (medium density), a molding temperature of about 120°–145°C. and a molding pressure of about 100–700 psi may be used.

To produce a high density molded product, a molding temperature of about 120°–165° C. and a molding pressure of about 700–1500 psi may be used. Using suitably high pressure and temperatures it is possible to produce a very high density material which could be used, for example, to replace slate in pool table tops. Such a product is so dense that a .22 caliber rifle bullet, fired from close range, will not penetrate beyond 4 or 5 mm.

The dwell time in the mold may vary over a wide range depending on the thickness of the board and the desired density of the product. The material acts as an insulator; a thicker molded product requires more time for the heat from the mold to fully penetrate it and for it to cure after crosslinking occurs. To achieve uniform crosslinking across the thickness of the product, longer dwell times can be used, and the temperature may be reduced accordingly. It has been found that for a given temperature, pressure and thickness, increased dwell time results in increased product density. Dwell times in the range of about 5 seconds to 30 minutes have been used with success.

The mold should be vented to permit the continuous escape of steam and other gases produced during molding.

In some cases, the molded material should be permitted to cure after molding to relieve internal stresses. For high density material, a longer cure time is required and it may be desirable immediately after molding to transfer the molded product to an unheated mold at pressure similar to the molding pressure to allow the product to cure.

When dissociated lignocellulosic material is molded in the manner described, the lignin crosslinks with furfural, fatty acids and xylan. As the molding temperature is increased, up to about 240° C., the acids in the dissociated lignocellulosic material react at an increasing rate with the xylan and xylose sugars to produce higher concentrations of furfural, which will in turn increase the degree of crosslinking with the lignin, thereby producing a denser and stronger product. By controlling these reactions, one can vary the strength, water resistance and density of the molded product.

If it is desired to increase the speed of the reaction or lower the molding temperature, or both, an acid catalyst (such as a mineral acid, an organic acid, or a Lewis acid or a mixture thereof) can be added to increase the rate and degree of hydrolysis of the xylan and xylose sugars to furfural, which in turn increases the degree of crosslinking with the lignin. It is also possible to add paraformaldehyde, six carbon sugars either free or combined as glycosides or as short chain oligosaccharides, or some other crosslinking agent to the dissociated lignocellulosic material to produce a higher degree of crosslinking than happens with only the furfural which is produced from the xylose and the xylan in the material both during the explosion process and during the heating cycle in the mold.

In the process described above, the dissociated lignocellulosic material forms both the filler and the binder of the molded product. However, the invention is also directed to the use of dissociated lignocellulosic material in association with such materials as sawdust, wood wafers, wood fibers, straw fibers, bagasse fibers, fiber glass fibers, asbestos fibers, carbon fibers, coal, sand and the like. Here the dissociated lignocellulosic material contributes to the molded product as a filler, but is intended to act primarily as a binder, replacing in whole or in part the phenolic resins and similar substances that are commonly used as binders when such materials are molded. If used, these materials should be mixed thoroughly with the dissociated lignocellulosic material prior to molding.

Generally, the higher the proportion of these materials, the softer the molded product. For example, to produce a relatively soft end product, sawdust may be mixed with the dissociated lignocellulosic material to be molded in a ratio of about 4 parts sawdust:1 part dissociated lignocellulosic material. To make a firmer board, ratios of 1 part or less sawdust:1 part dissociated lignocellulosic material may be employed.

It will be apparent to one skilled in the art that various mixtures of these filler materials may be used and various combinations of molding pressure, temperature and dwell time employed to produce a molded product having the characteristics desired for a particular application. Also, preservatives, water repellents, fire retardants and the like can be added to the material before molding to produce those additional characteristics when required.

It is also possible to mix fertilizer material with the material to be molded, prior to molding. The resulting product will permit the slow release of the fertilizer into the soil, avoiding the rapid run-off and contamination of waterways that often occurs when fertilizer is used by farmers.

In the embodiment of the invention that will now be described, the water-soluble substances in the dissociated lignocellulosic material are removed by washing with water. This removes most of the crosslinking capability of the mixture. The water-soluble substances include acetic acid, glucoronic acid, vanillin, syringaldehyde, plant protein, furfural, inorganic salts, xylose and xylose oligomers.

In order to restore the binding properties of the water-washed, dissociated lignocellulosic material it is necessary to add crosslinking compositions. Typically such compositions would include an acidic catalyst (one or more of the set of mineral acids like sulfuric acid, organic acids like acetic acid, or Lewis acids like zinc chloride) in conjunction with a carbohydrate component consisting of five-carbon sugars, such as those in the water-solubles extracted from the dissociated lignocellulosic material, or six-carbon sugars, their glycosides or short chain oligosaccharides, or a mixture of five-carbon and six-carbon sugars. The active crosslinking agent during the molding process is furfural if the source is a five-carbon sugar, and hydroxymethylfurfural if a six-carbon sugar. Therefore, furfural or hydroxymethylfurfural and the like may replace or supplement the amorphous carbohydrate component in the composition. It is our experience that the hydroxymethylfurfural is a markedly superior crosslinking material, thus a six-carbon sugar is preferred.

To remove the water-soluble substances, the dissociated lignocellulosic material is washed in a column. This can be done using a column having an upper opening through which solvent can be added and the dissociated lignocellulosic material put into the column, and a lower opening for the removal of the eluant. (In this specification, "eluant" means a solvent with its dissolved or suspended materials which is removed from the column.) The column can conveniently be a cylinder or rectangular tube open at the top and having a drainage system at the bottom leading to a line and vessel for recovering the eluant. The column can be filled to various heights with dissociated lignocellulosic material, depending on the degree of leaching desired. The inventor has obtained good results with a five foot high column of material, but heights from one foot to over twenty feet have been used successfully.

Water occurs naturally in the lignocellulosic material and more is added by absorption during the first stage of the explosion process. Hence, the water soluble fraction of the dissociated lignocellulosic material is already dissolved in the water in the material.

Packing or compressing of the material in the column hampers solvent flow and is therefore to be avoided. Water is then added to the column. The fluid percolates down through the bed, pushing the slug of connate water containing the water solubles ahead of it. The solution which exists at the bottom of the column is initially very concentrated, but, because not all channels for fluid flow are swept by the incoming fluid at the same rate due to their different pore or channel sizes, perfect plug flow is not realized and the concentration of dissolved matter falls off exponentially. Water extractable substances comprise approximately 25% by weight of the dissociated lignocellulosic material (on a dry basis). For a five foot high column of loosely filled dissociated lignocellulosic material, more than 99 percent of the water solubles can be removed with only two column volumes of water.

Removal of the water solubles can be accomplished by other methods, such as conventional pulping techniques that involve solvent exchange by massive dilution of the solution already present using very large volumes of water. From the point of view of using the water-washed material for molding, it is unimportant how the water solubles are removed; however, the column method described herein permits the economical recovery of the water-soluble substances, and is therefore to be preferred.

After water-washing, the dissociated lignocellulosic material is essentially free of chemical reagents which are capable of crosslinking with the lignin. If desired, the dissociated lignocellulosic materials may be washed less thoroughly so that only some of the crosslinking chemical reagents are removed.

In order to recover the binder qualities of the material, it is necessary to add an appropriate crosslinking composition. Typically such a composition would include a water-soluble acid (such as sulfuric acid, or acetic acid) together with a 5-carbon or 6-carbon sugar (or a mixture of a 5-carbon and a 6-carbon sugar) in free form or glycosides or in conjugates such as low molecular weight oligosaccharides. These carbohydrates may be obtained from the water-solubles that were washed from the dissociated lignocellulosic material. The crosslinking composition, which may contain acid in strengths of 0.2 to 1.0% and sugars in the concentration range of 2–12%, is added to the top of the column and allowed to drain through the material. Initially, water from the previous wash exits the column in plug flow. Sufficient composition is added such that the pH of the aqueous eluant exiting the column is as low as the column's entry solution indicating that the acid is leaving the column having wet the entire column's contents equally. At this point, the material is removed from the column, dewatered as much as practical, and then further dried in air or a heated drier. The material can then be milled or ground to produce a fine powder suitable for use as a binder. Prior to molding, the dried material may be mixed with the fibrous aggregate materials, preservatives, water-resistant agents, and flame retardants as required by the specification. To improve the water resistance of the molded product when water absorbing fillers such as saw dust or wood chips are used, the saw dust or wood chip material can be impregnated with the acid/carbohydrate crosslinking material. This will produce furfural or hydroxymethylfurfural at the binder/filler interface to create a seal around the filler. In general, the material can be used for molding in the same manner as dissociated lignocellulosic material that has not been subjected to the water-washing process.

In some cases it is desired to use the molded finished product for combustion and an aggregate material such as coal will be incorporated into the product. Here, there may be mixed with the crosslinking composition, before adding it to the column, agents which promote combustion (such as nitrate salts), and flame colouration materials (various inorganic salts depending upon colours desired). Such molded combustibles may ultimately take the form of firelogs or briquet-like chunks.

In the case where neither mineral or organic acids are used in the crosslinking composition, but a Lewis acid salt is employed instead, then this salt must be mixed in the dry form and ideally with material having a moisture content lower than 1%.

Insofar as the acid behaves as a catalyst, small quantities are used, but the absolute amount required may depend on the nature of the fibrous or aggregate material, and its ability to withdraw the acid from the cross-linking carbohydrate material by capillary action. Typically, a solution of less than 1% by weight of acid catalyst is required. In whole dissociated lignocellulosic material, the amorphous carbohydrate content is in the range of 15% to 25% depending on the input lignocellulosic material. By water-washing the dissociated lignocellulosic material and combining with other crosslinking carbohydrate agents, this amount of sugar can be reduced to less than half and the final composition will still serve as an effective binder.

What is claimed is:

1. A method of molding dissociated lignocellulosic material comprising the steps of:
   (A) preparing the dissociated lignocellulosic material by;
      (1) packing lignocellulosic material in a divided, moist form in a pressure vessel having a valved outlet,
      (2) with the valve closed, rapidly filling the pressure vessel with steam at a pressure of at least 400 psi to bring substantially all of the lignocellulosic material to a temperature in the range of 185° C. to 240° C. in less than 60 seconds to thermally soften the lignocellulosic material into a plastic condition,
      (3) as soon as the plastic condition has been attained, opening the valved outlet and instantly and explosively expelling the lignocellulosic material from the pressure vessel to atmosphere, and wherein the explosive expulsion breaks the chemical cross-link between the lignin and hemicellulose of the lignocellulosic material and produces a mixture of water-soluble chemical substances, whereby dissociated lignocellulosic material is produced;
   (B) washing the said dissociated lignocellulosic material with water to substantially remove the said water-soluble chemical substances;
   (C) adding a cross-linking agent and catalyst therefor to the washed dissociated lignocellulosic material to provide a moldable dissociated lignocellulosic material, said cross-linking agent being selected from the group consisting of a five carbon sugar, a six carbon sugar, their glycosides and conjugates, furfural, and hydroxymethylfurfural, and mixtures thereof, and said catalyst being an acidic catalyst;
   (D) drying the moldable dissociated lignocellulosic material to a water content of about 5% or less;
   (E) packing the moldable material into a heated, vented mold;
   (F) applying sufficient pressure in the range of 20–700 psi for a sufficient time in the range of 5 seconds to 30 minutes and at a sufficient temperature in the range of 70° C. to 260° C. to the moldable material in the mold to cause it to form a rigid product; and
   (G) discharging the molded product from the mold.

2. A method according to claim 1, wherein the mold is preheated to a temperature between approximately 70°–260° C. and wherein a mold platen preheated to approximately 300° C. is applied to the molded product after it is formed.

3. A method according to claim 1, wherein a molded product having a density like that of corkboard is desired, and the mold is preheated to a temperature between approximately 70°–110° C., and a pressure between approximately 20–90 psi is applied to the material in the mold.

4. A method according to claim 1, wherein a molded product having a density like that of furniture board is desired, and the mold is preheated to a temperature between approximately 120°–145° C., and a pressure between approximately 100–700 psi is applied to the material in the mold.

5. A method according to claim 1, wherein a preservative substance is added to the dissociated lignocellulosic material prior to molding.

6. A method according to claim 1, wherein a water repellent material is added to the dissociated lignocellulosic material prior to molding.

7. A method according to claim 1, wherein a fire retardent material is added to the dissociated lignocellulosic material prior to molding.

8. A method according to claim 1, wherein the said acidic catalyst selected from the group comprising a mineral acid, an organic acid and a Lewis acid.

9. A method according to claim 1, wherein the molded product is transferred from the hot mold to an unheated mold under similar pressure to allow the molded product to cure.

10. A method of producing a molded product according to claim 1, including the steps of:
    (a) mixing together the dissociated lignocellulosic material and filler materials selected from the group comprising wood wafers, wood fibers, straw fibers, bagase fibers, sawdust, fiber glass fibers, asbestos fibers, carbon fibers, fertilizer, coal and sand.

11. A method according to claim 10, wherein the dissociated lignocellulosic material contains excessive moisture and the moisture content is reduced to a suitable level of about 5% or less before molding.

12. A method according to claim 10, wherein the selected material is sawdust, which is used in a proportion of 4 parts or less of sawdust; 1 part dissociated lignocellulosic material.

13. A method according to claim 10, wherein the mold is preheated to a temperature between approximately 70°–260° C.

14. A method according to claim 13, wherein a mold platen preheated to approximately 300° C., is applied to the molded product after it is formed.

15. A method according to claim 10, wherein a preservative substance is added to the material to be molded prior to molding.

16. A method according to claim 10, wherein a water repellent material is added to the material to be molded prior to molding.

17. A method according to claim 10, wherein a fire retardant material is added to the material to be molded prior to molding.

18. A method according to claim 10, wherein the molded product is transferred from the hot mold to an unheated mold under similar pressures to allow the molded product to cure.

19. A method according to claim 10, wherein the crosslinking agent and catalysts are impregnated into the filler material prior to molding.

20. The product produced by the method of claim 10.

21. A method according to claim 1, wherein the said crosslinking agent is selected from the group comprising 5-carbon and 6-carbon sugars in free or combined form.

22. A method according to claim 1, wherein the said crosslinking agent comprises hydroxymethylfurfural.

23. A method according to claim 1, wherein the said crosslinking agent comprises furfural.

24. A method according to claim 1, wherein the concentration of the acidic catalyst in the crosslinking agent is in the range of about 0.2% to 1.0%, and the concentration of the crosslinking agent in the crosslinking agent/catalysts composition is in the range of approximately 2% to 12%.

25. The product produced by the method of claim 1.

* * * * *